United States Patent [19]
DeMars

[11] Patent Number: 5,727,451
[45] Date of Patent: Mar. 17, 1998

[54] BROILER APPARATUS

[75] Inventor: Jimmy A. DeMars, Hugo, Minn.

[73] Assignee: The Pillsbury Company, Minneapolis, Minn.

[21] Appl. No.: 816,901

[22] Filed: Mar. 13, 1997

Related U.S. Application Data

[63] Continuation of Ser. No. 614,189, Mar. 12, 1996, abandoned, which is a continuation of Ser. No. 530,713, Sep. 19, 1995, abandoned.

[51] Int. Cl.⁶ .............. A23L 1/01; A23L 3/32; A47J 37/00; A47J 37/04
[52] U.S. Cl. .............. 99/386; 99/400; 99/443 C; 99/444; 99/446
[58] Field of Search .............. 99/385, 386, 391, 99/400, 401, 443 R, 443 C, 444–446, 475–479; 126/21 A, 41 C, 190; 426/523; 219/388, 400

[56] References Cited

U.S. PATENT DOCUMENTS

| | | | |
|---|---|---|---|
| Re. 34,671 | 7/1994 | Long | 99/386 |
| 758,472 | 4/1904 | Reams . | |
| 2,028,649 | 1/1936 | Conroy | 53/6 |
| 2,149,537 | 3/1939 | Morton | 107/57 |
| 2,180,868 | 11/1939 | Dunning et al. | 126/41 |
| 2,584,061 | 1/1952 | Stilphen | 99/423 |
| 2,599,455 | 6/1952 | Husemann | 134/130 |
| 2,685,637 | 8/1954 | Oatley | 219/37 |
| 2,728,334 | 12/1955 | Paolella | 126/25 |
| 2,746,378 | 5/1956 | Lang | 99/447 |
| 2,769,531 | 11/1956 | Guba | 198/203 |
| 2,788,735 | 4/1957 | Farace | 99/443 |
| 3,167,642 | 1/1965 | Reis | 219/413 |
| 3,174,863 | 3/1965 | Shoup | 99/1 |
| 3,209,678 | 10/1965 | Benson et al. | 99/406 |
| 3,263,799 | 8/1966 | Bacom et al. | 198/193 |
| 3,300,030 | 1/1967 | Scherfel | 198/193 |
| 3,321,314 | 5/1967 | Jeppson | 99/107 |
| 3,340,794 | 9/1967 | Giuliano | 99/443 |
| 3,448,678 | 6/1969 | Burstein | 99/386 |
| 3,542,188 | 11/1970 | Kinney, Jr. | 198/193 |
| 3,563,366 | 2/1971 | Daringer | 198/193 |
| 3,587,445 | 6/1971 | Kircher | 99/331 |
| 3,633,737 | 1/1972 | Magaldi | 198/196 |
| 3,731,894 | 5/1973 | Curran et al. | 245/6 |
| 3,823,660 | 7/1974 | Nerthling | 99/386 |
| 3,842,726 | 10/1974 | Fautz | 99/445 |
| 3,910,175 | 10/1975 | Smith | 99/474 |
| 3,920,117 | 11/1975 | Roinestad | 198/194 |
| 3,948,160 | 4/1976 | Stickle | 99/404 |
| 4,002,112 | 1/1977 | Snyder | 99/376 |
| 4,034,662 | 7/1977 | McLane | 99/445 |
| 4,045,166 | 8/1977 | Kaleel | 432/146 |
| 4,078,655 | 3/1978 | Roinestad | 198/848 |
| 4,126,087 | 11/1978 | McLamb | 99/327 |
| 4,154,861 | 5/1979 | Smith | 99/477 |
| 4,186,566 | 2/1980 | AuYoung | 62/380 |

(List continued on next page.)

FOREIGN PATENT DOCUMENTS

| | | |
|---|---|---|
| 0 165 348 | 12/1985 | European Pat. Off. . |
| 02 004132 | 1/1990 | Japan . |
| 697969 | 10/1953 | United Kingdom . |
| 953568 | 4/1964 | United Kingdom . |
| WO 87 00410 A | 1/1987 | WIPO . |

*Primary Examiner*—Timothy F. Simone
*Attorney, Agent, or Firm*—Westman, Champlin & Kelly, P.A.

[57] ABSTRACT

A conveyorized commercial broiler apparatus has upper and lower burners above and below the conveyor for broiling meat products carried on the conveyor. A plurality of perforated sheet grids are provided to control flame flare-ups and cause the fat that may drip onto the perforated sheets to be vaporized and quickly and cleanly burn prior to pyrolization. The perforated sheets are selected to be low thermal mass, and thus relatively thin and perforated to a point where they have preferably between 25% and 75% open area. The perforated sheets are positioned in selected locations to control combustion and vaporization of fat rendered from the meat product being broiled.

21 Claims, 6 Drawing Sheets

U.S. PATENT DOCUMENTS

| | | | |
|---|---|---|---|
| 4,354,479 | 10/1982 | Haruhara | 126/92 |
| 4,363,955 | 12/1982 | Gauthier et al. | 219/388 |
| 4,368,664 | 1/1983 | Smith et al. | 99/386 |
| 4,377,109 | 3/1983 | Brown et al. | 99/401 |
| 4,430,559 | 2/1984 | Rabay | 219/460 |
| 4,462,307 | 7/1984 | Wells | 99/386 |
| 4,599,990 | 7/1986 | Fritzsche et al. | 99/403 |
| 4,630,593 | 12/1986 | Gremillion | 126/25 |
| 4,653,461 | 3/1987 | Eke | 126/21 A |
| 4,662,349 | 5/1987 | McKenzie et al. | 126/41 R |
| 4,750,469 | 6/1988 | Biggs | 126/25 |
| 4,909,137 | 3/1990 | Brugnoli | 99/444 |
| 4,909,237 | 3/1990 | Karpinia | 126/25 |
| 4,936,286 | 6/1990 | Baker | 126/41 C |
| 4,991,497 | 2/1991 | Barkhau et al. | 99/349 |
| 5,031,602 | 7/1991 | Vick | 126/25 |
| 5,033,365 | 7/1991 | Rao et al. | 99/446 |
| 5,044,266 | 9/1991 | Geogaris | 99/446 |
| 5,073,391 | 12/1991 | DeMars et al. | 426/231 |
| 5,076,154 | 12/1991 | Bagwell | 99/446 |
| 5,101,714 | 4/1992 | Grandi | 99/443 C |
| 5,129,312 | 7/1992 | Berger | 99/340 |
| 5,163,358 | 11/1992 | Hanagan et al. | 99/339 |
| 5,176,249 | 1/1993 | Esterson et al. | 198/850 |
| 5,195,425 | 3/1993 | Koziol | 99/447 |
| 5,221,105 | 6/1993 | Liu | 99/446 |
| 5,242,704 | 9/1993 | Prestigiacomo | 426/523 |
| 5,289,759 | 3/1994 | Hufford | 99/330 |
| 5,331,886 | 7/1994 | Basel | 99/446 |
| 5,399,439 | 3/1995 | Rasmussen | 428/596 |
| 5,401,378 | 3/1995 | King et al. | 204/418 |
| 5,423,416 | 6/1995 | Kucharski | 198/690.2 |
| 5,546,853 | 8/1996 | Heil et al. | 99/447 |

BROILER APPARATUS

This is a continuation of application Ser. No. 08/614,189, filed Mar. 12, 1996, now abandoned which was a continuation application of Ser. No. 08/530,713, filed Sep. 19, 1995, now abandoned. Priority of the prior applications is claimed pursuant to 35 USC §120.

BACKGROUND OF THE INVENTION

The present invention relates to a broiler apparatus provided with perforated metal grids positioned relative to the burners and conveyor combined to control combustion of fat that liquifies from the cooking process to avoid "flares" and undesirable combustion products, while adequately removing the fat from the broiler system.

In commercial double burner broilers, a chain link conveyor moves the product, such as a meat patty, between a series of upper and lower burners. As the product is carried on an upper length of the of the broiler conveyor, fat is rendered as the product is cooked. Some combustion of fat while cooking is desirable because of the grill like flavor and appearance of the product, but the more fat the product contains, the more likelihood there will be flare-ups occurring due to fat accumulation on the upper side of a meat patty or product which could ignite in the standard broiler. Likewise, the fat dripping down through the broiler conveyor into the lower burners can ignite, again causing flare-ups. The standard lower burners do have shields on the top for preventing fat from dripping directly onto the burners, but fat on top of the hot shield also can pyrolize. A commercial broiler as to which the present invention is an improvement is schematically show a in U.S. Pat. No. 4,936,286.

In certain instances, barbecue grills for home use have been provided with a fire retarding screen suspended above the bed of coals, and below the cooking grill. A metal wire screen woven to form a mesh will tend to retard flame passage and provide greater heat intensity for cooking the food at a faster rate, causing any grease or fat drippings from the food to be dissipated to eliminate accumulation or build up.

SUMMARY OF THE INVENTION

The present invention relates to adding heat conducting open space metal grids, perforated sheets or screens which form open space grids to more uniformally distribute heat from broiler burners, and aid in controlling flame flare-ups by uniformally disbursing fat that has been rendered from a meat product being cooked. The perforated (open space) grid suppresses flames that may flare up from burning fat as well as improving the combustion of fat that drips onto a perforated (open space) grid. The present invention further serves to cause turbulence of air adjacent to and passing through the open spaces of the grids to improve oxygenation of vaporized fat and thus disperse the fat dripping from the product.

The illustrated embodiment of the present invention is installed in a commercial conveyorized broiler which has upper burners above a conveyor that carries meat patties or other meat products, and a set of lower burners below the conveyor. One perforated grid or screen used for flame arresting and fat dispersion is positioned between the upper burner and the meat patties to reduce the level of flame flare-up from occurring due to fat accumulation on the upper side of the meat patty or product. Vapors that are present can pass through this upper grid and the grid inhibits flashback from the upper burners. The grid above the meat patties acts as a flame arrestor, to control unwanted burning.

Additionally, the present invention includes an assembly of two open space metal grids or screens spaced closely together and positioned below the plane of food support on the conveyor. In one form of the invention a pair of perforated sheet grids are mounted between the upper and lower conveyor runs or lengths, to provide for air mixing and controlling the temperature of fat drippings, to in turn provide more uniform heating and cleaner combustion. The open space grids have a low thermal mass so that the liquid fat, which is essentially an oil, forms a thin film on the solid metal parts of the open space grids while absorbing heat and lowering the temperature of the low thermal mass grid to quickly vaporize. The open space grids have spaces or openings of size to prevent flames from passing up and contacting the food product that is moving on the upper length of the conveyor. The air mixing is due to the open spaces or perforations in the grid which permit air to flow and cause turbulence. If desired, a manifold connected to an air source can direct air between the perforated sheets forming the grid layers for further oxygenating the vaporized fat.

Another perforated sheet grid is utilized directly above each of the lower burners, below both lengths of the conveyor, to act as a shield which again causes the fat in liquid form to spread out into a thin film in a region where air is available for clean burning. Any flames from combustion on the lower grid are arrested by the grid layers between the conveyor lengths before the flames contact the product on the conveyor.

Finally, in units using a drip retaining pan below the lower burners, a perforated sheet grid or screen is positioned above this drip pan acts as a flame arrestor to prevent pan fires. Some combustion of fat occurs on the upper side of this lower screen, but the flames are brief and the fat burns cleanly.

The size of the openings in the open space metal grid is selected to optimize the flame quenching effect as is well known. The holes can be slots or open spaces formed by wire configured properly. The critical dimension is the narrow direction of the opening and the openings thus can be elongated and provide the flame quenching function. The openings can have any selected outer peripheral configuration to provide for air passage through the grid and provide flame quenching.

DETAILED DESCRIPTION OF THE PREFERRED EMBODIMENTS

Figure 1:
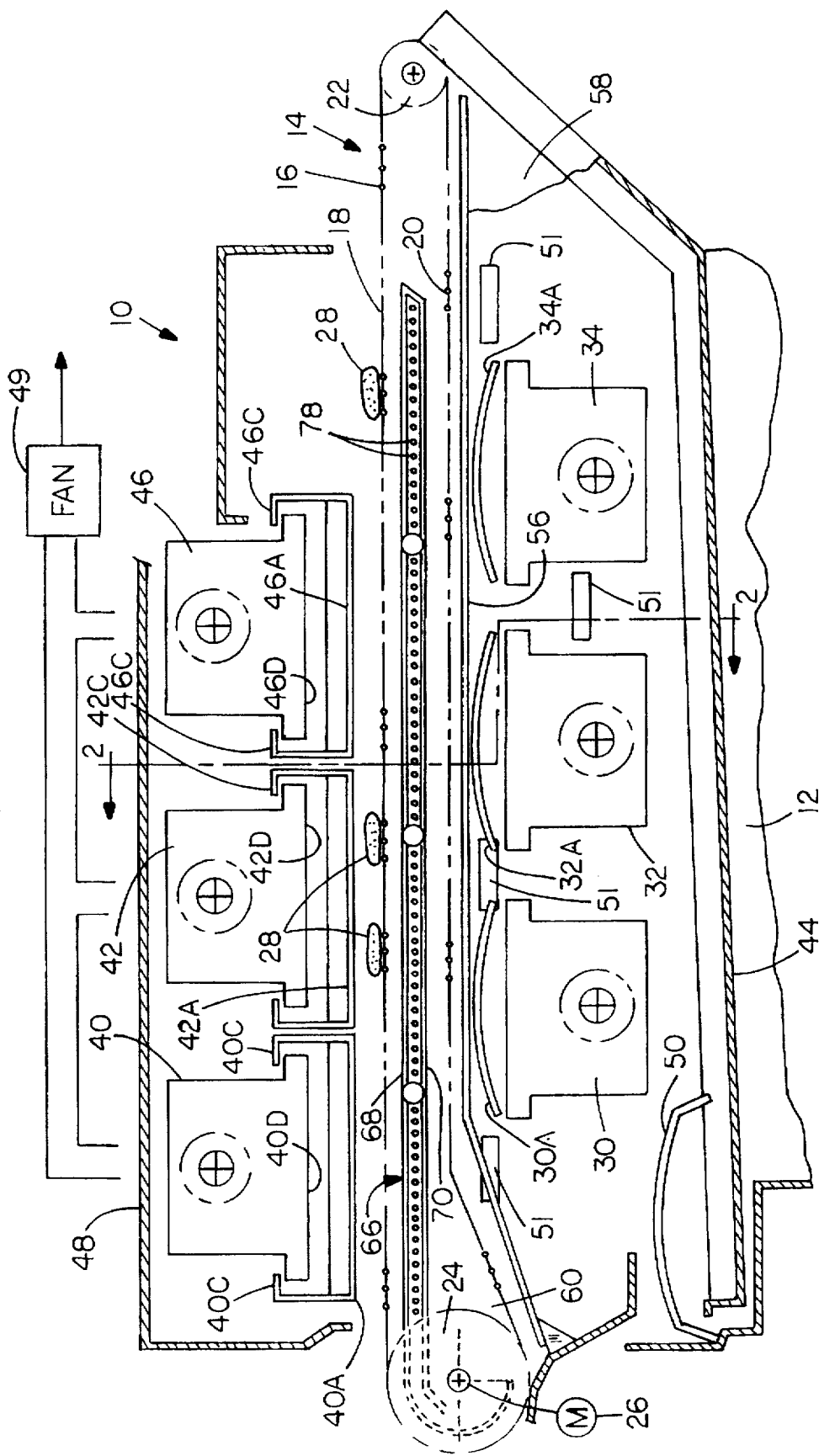
FIG. 1 is a schematic side sectional view of a typical commercial conveyorized broiler embodying the improvements made according to the present invention.

A commercial broiler apparatus illustrated generally at 10 comprises a frame 12, which is shown schematically, and which supports in a known manner a conventional chain type food product conveyor comprising one or more sections of transverse rods or slats mounted on chain links in opposite ends of the rods or slats in a conventional manner. The conveyor is indicated generally at 14, and individual transverse rods are shown at 16. The conveyor has an upper length or reach 18 and a lower length 20, which are formed from the endless conveyor 14 mounted over an input end sprocket 22 and a drive sprocket or wheel 24. The drive sprocket or wheel 24 is driven with a suitable motor 26 under controls that are well known.

The broiler apparatus is used for broiling food products such as hamburger patties illustrated generally at 28, or chicken or other food products. The broiler apparatus includes a series of upwardly open lower burners shown at 30, 32 and 34, which have standard shields 30A, 32A and 34A positioned over the burners, respectively, in a conventional manner. The broiler apparatus further includes upper burner assemblies 40, 42 and 46, respectively positioned within an outer housing 48.

The upper burners open downwardly. The burner assemblies are of conventional design and are supported in the frame 12 in a conventional manner. The burners as shown are gas burners that may have suitable screens over the burners for providing radiant energy for cooking the food product 28. The same principal will work for electrically heated broilers or other radiant heat sources.

A drip pan 44 is provided on the lower side of the frame 12 below the lower burners 30, 32 and 34 for catching fat that may drip from the food product.

An exhaust or blower 49 of conventional design is positioned above housing 48 and provides a controlled exhaust flow from the housing to assure venting of all gases from the system.

The open space metal grid or screen system of the present invention is used for controlling the dispersion of fat which may drip from food product 28 (such as a hamburger). The grids aid in preventing excessive flare-ups, as well as encouraging vaporization to provide cleaner burning of the oils or fats, to enhance flavor and appearance of the food product. It is desirable to prevent flame flare-ups during the cooking process to avoid excessively burning the food product, which occurs if the flames contact the food.

The present system for clean efficient burning, preferably includes four different open space sheet grids used for different purposes to reduce overall flare-ups and also to reduce pyrolysis of fat drippings. One or more open space metal grid or screen can be used. Additional open space grids can be added but the benefits from each additional open space grid are reduced.

A first zone or location of an open space metal grid or screen is illustrated by grid 50 which is formed to fit over at least a portion of the drip pan 44. As shown a perforated sheet open space grid 50 is at a low end of the drip pan 44 where fat will tend to flow if it drips past the burners 30, 32 and 34. The perforated sheet open space metal grid 50 is made in the same manner as additional grids that are used herein, as shown generally in FIG. 3, and comprises a flat metal sheet 52 that has a plurality of apertures 54 formed therethrough. The open space metal grids are made to minimize their thermal mass, for reasons that will be explained, and in general a preferred perforated open space grid is made of metal such as a selected type of mild steel or stainless steel that may have openings in the range of 5/32 an inch diameter and with between about 25% and 75% open space. Preferably, the open space in the grid is in the range of about 60% to 65% open, with a most desired open percentage of about 63% open. The low thermal mass is obtained by having a large percentage of open space. The openings can be formed in conventional ways and are selected in size and shape to control flames and to provide open areas for radiant heat to pass through and fat and oxygen passage. When reference to oxygen is made in this specification it refers to the oxygen contained in air.

The perforated sheet open space grid 50 extends transversely across the broiler housing, and is used to prevent flare-ups, and thus acts as a flame arrestor. If fat in the drip pan 44 reaches ignition temperature, the flames will not pass through the open space grid 50.

Figure 1A:
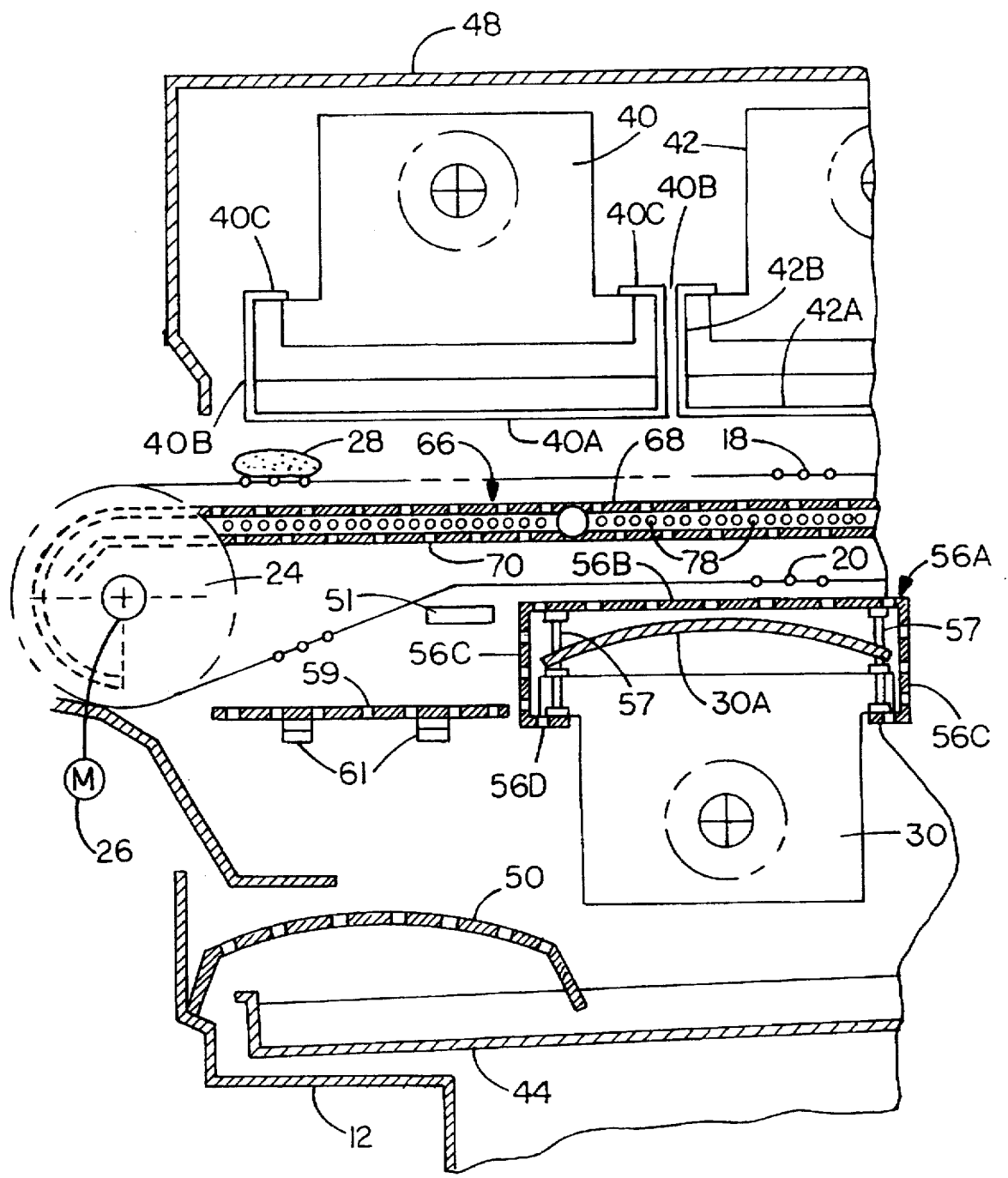
FIG. 1A is an enlarged scale representation of a portion of FIG. 1.
Figure 2:
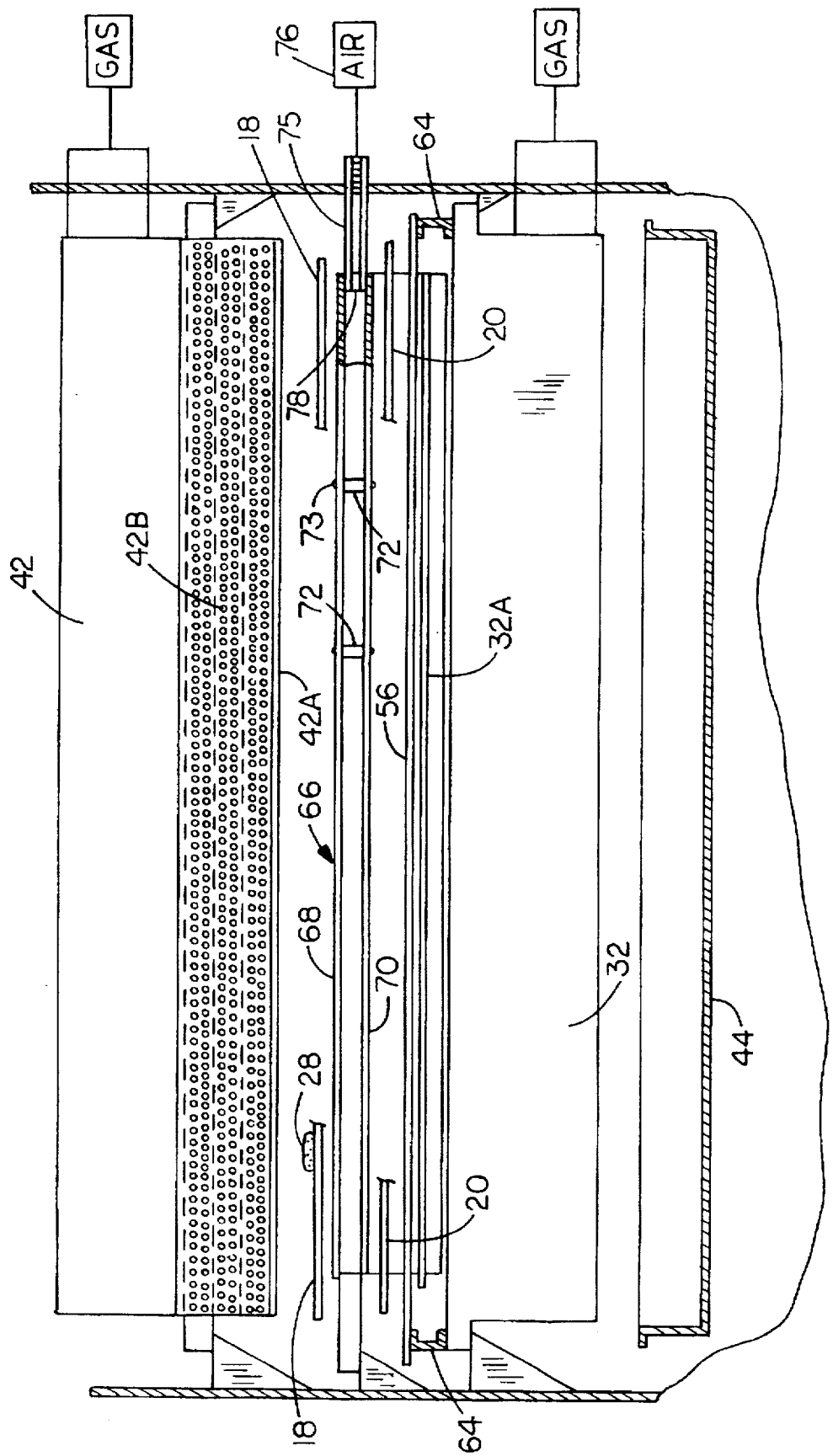
FIG. 2 is a fragmentary sectional view taken as on line 2—2 in FIG. 1.
Figure 2A:
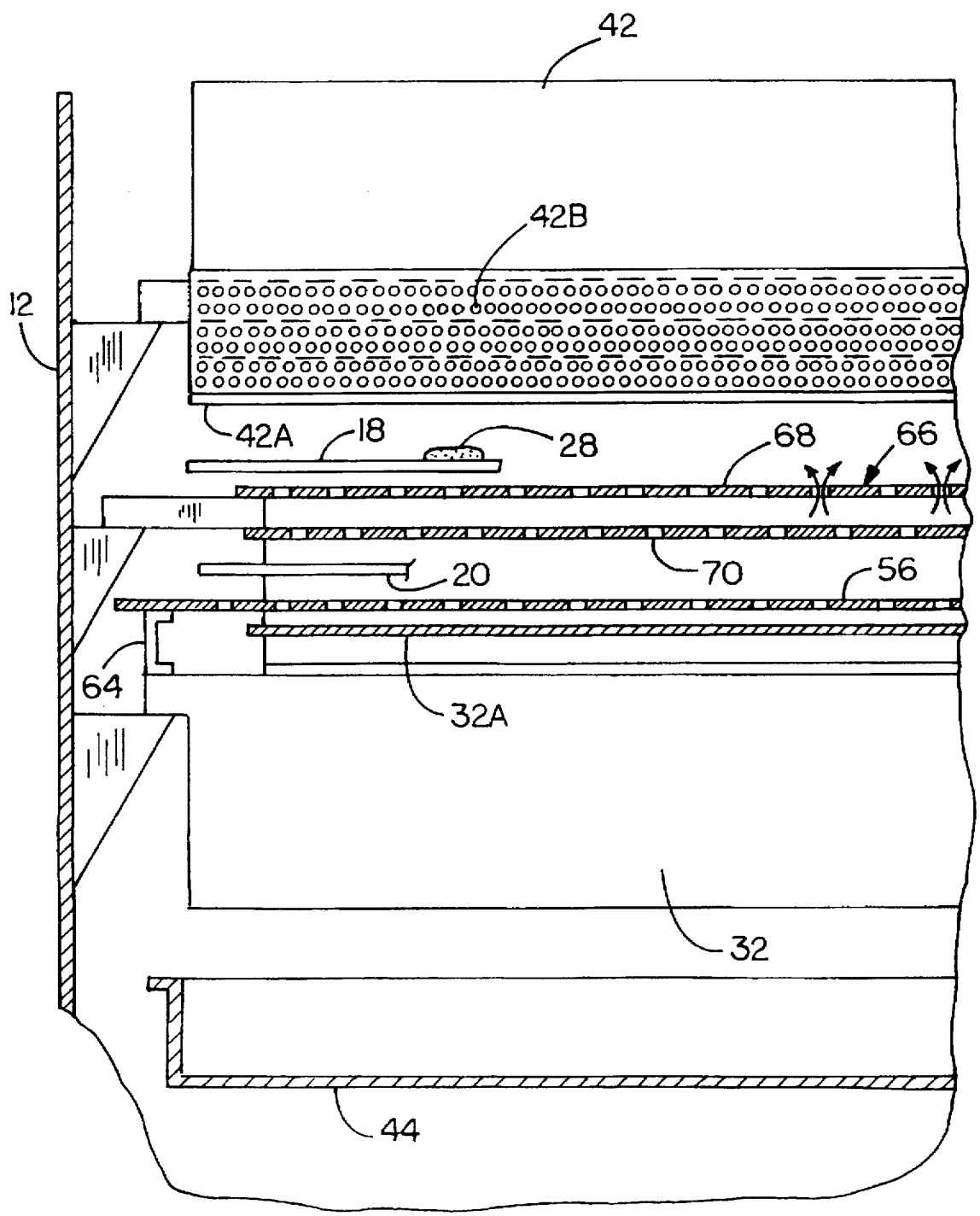
FIG. 2A is an enlarged representation of a portion of FIG. 2.

A second zone of grid usage is an open space grid positioned preferably between a position contacting, up to ½ inch above the burner drip shields 30A, 32A and 34A used for the lower burners 30, 32 and 34. The open space grid 56 is a perforated sheet and as illustrated schematically in FIGS. 1 and 2 is a sheet that extends from side to side across the frame 12 (see FIG. 2) and extends essentially from the inlet end 58 to the outlet end 60 of the conveyor and frame. In a preferred embodiment of the broiler the grid 56 is replaced with individual open space grid portions with one portion for each burner as shown in FIG. 1A. The perforated sheet open space grid 56 is supported in a suitable manner, such as on suitable brackets 64 (see FIG. 2) that are supported on the housings of the lower burners. FIG. 2 illustrates the burner 32.

Figure 3:
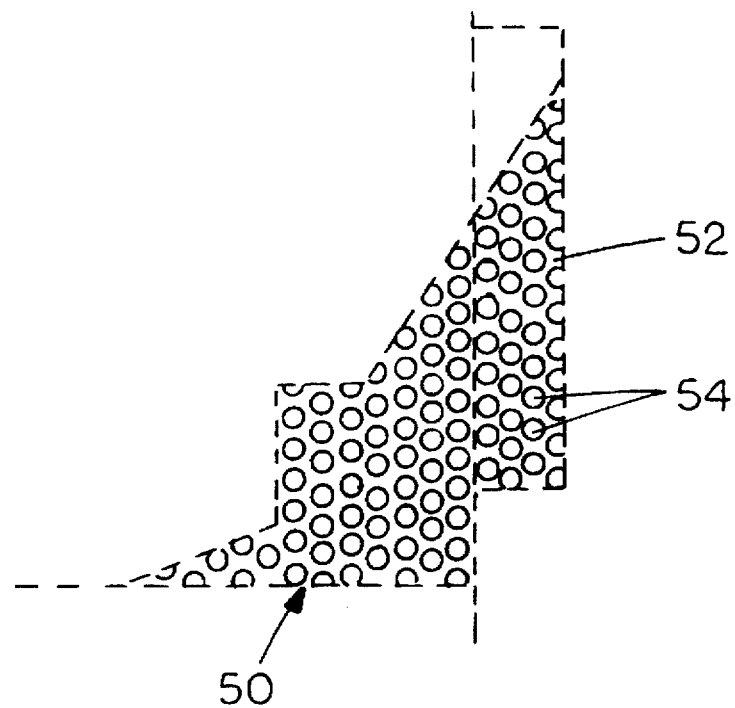
FIG. 3 is an exploded partial view of a typical perforated screen used with the present invention.
Figure 4:
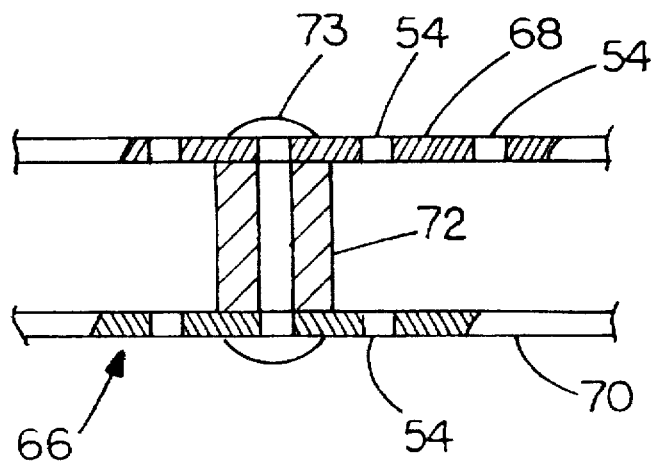
FIG. 4 is an enlarged view of the double perforated sheet grid assembly utilized in the portions of the broiler according to the present invention.

The sheet forming the open space grid 56 is perforated in the manner shown in FIG. 3, and is of suitable thickness, and usually of a selected type of metal such as mild steel or alloy steel usable with food products and capable of functioning at the temperatures reached. The perforated sheet open space grid 56 may have about 25% to 75% open space, but preferably it is perforated to have from about 60% to 65% open space, and the most desirable is about 63% open spaces. The perforations or openings cause eddy currents of air and turbulent airflow for mixing air with vaporized fat to provide cleaner, more uniform burning of the fat.

The perforated sheet open space grid 56 again is specifically made to have low thermal mass so that it will not only act as a flame quenching screen or arrestor, but also will cool quickly as the fat drippings hit it and are heated by the grid, so that the fat is not raised to a temperature where significant pyrolysis occurs. The fatty oils will form a thin film on the top surface of the grid and will quickly vaporize, and may oxidize rather than pyrolize to any substantial degree. Thus, combustion caused by the temperature of the open space grid 56 will cause the fat vapors to burn quickly and cleanly in turbulent air in small flames on the top of the open space grid 56, but no significant flare-ups occur. The combustion will take place where air is available, above the open space grid. The flames appear and quench quickly as the vapors ignite.

In FIG. 1A a modified form of the open space grid sheet 56 that is positioned between the burners and the conveyor is illustrated.

In this form of the invention, the perforated open space grid 56 that is positioned between the lower set of burners, 30, 32 and 34 is constructed substantially identical to the open space metal grids that will be explained in relation to the upper burners, and comprise open space grid portions 56A. There is one grid portion for each of the lower set of burners. The perforated open space grid portions are formed to have an upper panel 56B, and side panels 56C with inturned edges 56D that fit around the sides of the burner and underneath overhanging lips. The drip shield 30A (and the other drip shields) are supported on suitable standoff brackets 57 that are supported on the burner housings, as shown. The burner housing 30 and the standoff brackets are conventional, but in this case are elongated to provide a support on the under side of the upper panel 56B. The perforated sheet open space grid 56A is formed the same way as the perforated sheet open space grid 56. To provide a suitable open space grid above the grid 50, an auxiliary open space grid 59 is shown in position supported on suitable brackets 61 fastened onto the sidewalls of the broiler frame.

The use of perforated sheet open space grid portions over each lower burner is the preferred embodiment for mounting the open space grids below the conveyor and above the burner shields 30A, 32A and 34A, because it makes assembly easier.

A third perforated sheet open space grid assembly 66 is positioned below the food support plane of conveyor lengths, that is, between the upper length 18 that supports the food product 28 and the lower return length 20. The perforated sheet open space grid assembly 66 is, as shown, made with upper and lower individual perforated sheet open space grids 68 and 70. The perforated sheet open space grids 68 and 70 are spaced apart a desired amount, for example in the range of ⅛ to ½ inch, with ¼ inch spacing having been found to be suitable. The perforated sheet open space grids 68 and 70 also are made with a high percentage of open area, for example in the range of between 25% and 75%, with 60% to 65% open being preferred and the most preferred embodiment being about 63% open space. The two individual perforated sheets forming open space grids 68 and 70 are supported together with suitable spacers or standoffs 72 held in place with rivets 73 that join the grids at desired intervals. The standoffs 72 do not have to be closely spaced, and are kept to a minimum number to minimize the weight and minimize increase in thermal mass of the overall perforated sheet open space grid assembly 66.

The grid assembly 66, as can be seen, is suitably supported back to the frame 12 of the broiler apparatus, and is positioned so that the upper perforated sheet open space grid 68 is immediately below the upper length or reach 18 of the conveyor 14. Additionally, one edge of the perforated sheet open space grid assembly 66 may be mounted onto an elongated air manifold 75, which is supported onto a sidewall of the frame 12 of the broiler. The manifold 75 can be connected to a controlled air source 76 that provides a suitable volume of air under relatively low pressure through outlet orifices 78 on one edge of the manifold. The outlet orifices 78 are spaced along the length of the manifold 75, and when desired, the manifold 75 may be used to introduce air between the perforated sheet open space grids 68 and 70 to provide adequate oxygen for oxygenating vapors of any oil or grease that may be dripping down from the product 28 supported on the upper conveyor length. A horizontal airflow of between 2 to 3 ft/sec is a preferred airflow range when the auxiliary airflow is used. Flows 1 to 5 ft/sec will work when needed. The manifold is useful in cases where meats being broiled contain high volumes of fat. With control of airflow through the broiler, enough oxygen can be provided without use of the manifold.

The open space grids 68 and 70 have low thermal mass as explained, so that the grid assembly 66 not only acts as a flame arrestor for flames emanating from below and flaring toward the food product, but further causes air turbulence for air flowing through the perforations in the grids toward the food product 28. The fatty oil again forms into a thin film as the fats heat from contact with the metal portion of the perforated sheet open space grids as the grids cool. The fatty oil vaporizes to a substantial extent because the grids do cool, and the vapors can burn off quickly and cleanly. The perforation opening size is such that flames from below will not substantially pass through the upper grid perforations and burn above the grid. Pan fires or other flare-ups from the lower burners will be suppressed.

The lower perforated sheet open space grid 70 of assembly 66 also has low thermal mass so that the oil will move into a thin film on the upper surface of the perforated sheet open space grid 70 and quickly vaporize and cleanly burn off. The vapors that pass through the upper perforated sheet open space grid 68 will be burned off quickly without affecting the food product except to provide for a suitable flavor.

A single perforated sheet open space grid positioned in place of the double sheet open space grid assembly 66 will give positive but lesser results. The double layers insure control in a region that first receives the fat drippings from food products.

A final zone for the perforated sheet open space grid system of the present invention is the provision of perforated sheet open space grids between the food product 28 and the downward facing openings of the upper burners 40, 42 and 46. The upper perforated sheet open space grid portions, as can be seen in FIG. 2 comprise separate perforated sheet open space grid portions 40A, 42A and 46A, one below each upper burner. These open space grids are formed to have a horizontal bottom grid with upright legs 40B, 42B and 46B that in turn are formed to have inturned flanges 40C, 42C and 46C that are supported on the housings for each of the respective upper burners. The upper burner open space grids are constructed as previously explained, and are spaced downwardly from the lower edges 40D, 42D and 46D of the burners. The open space grids 40A, 42A and 46A are spaced above the food product 28. The open space grids 40A, 42A and 46A act as flame arrestors to prevent flashback from the upper burners due to fat or grease collecting on the upper surfaces of the food product 28, particularly when the food product is hamburger patties. The perforated sheet grids 40A, 42A and 46A will permit vapors that pass through the grids to burn, and to be taken off by the conventional ventilation system used with the broilers, such as a fan or blower 49 that provides a significant flow of air out of the housing 48. Inlet air is admitted through various inlets including inlets 51 below the conveyor 14 for providing airflow upwardly through the grid assembly 66.

Figure 5:
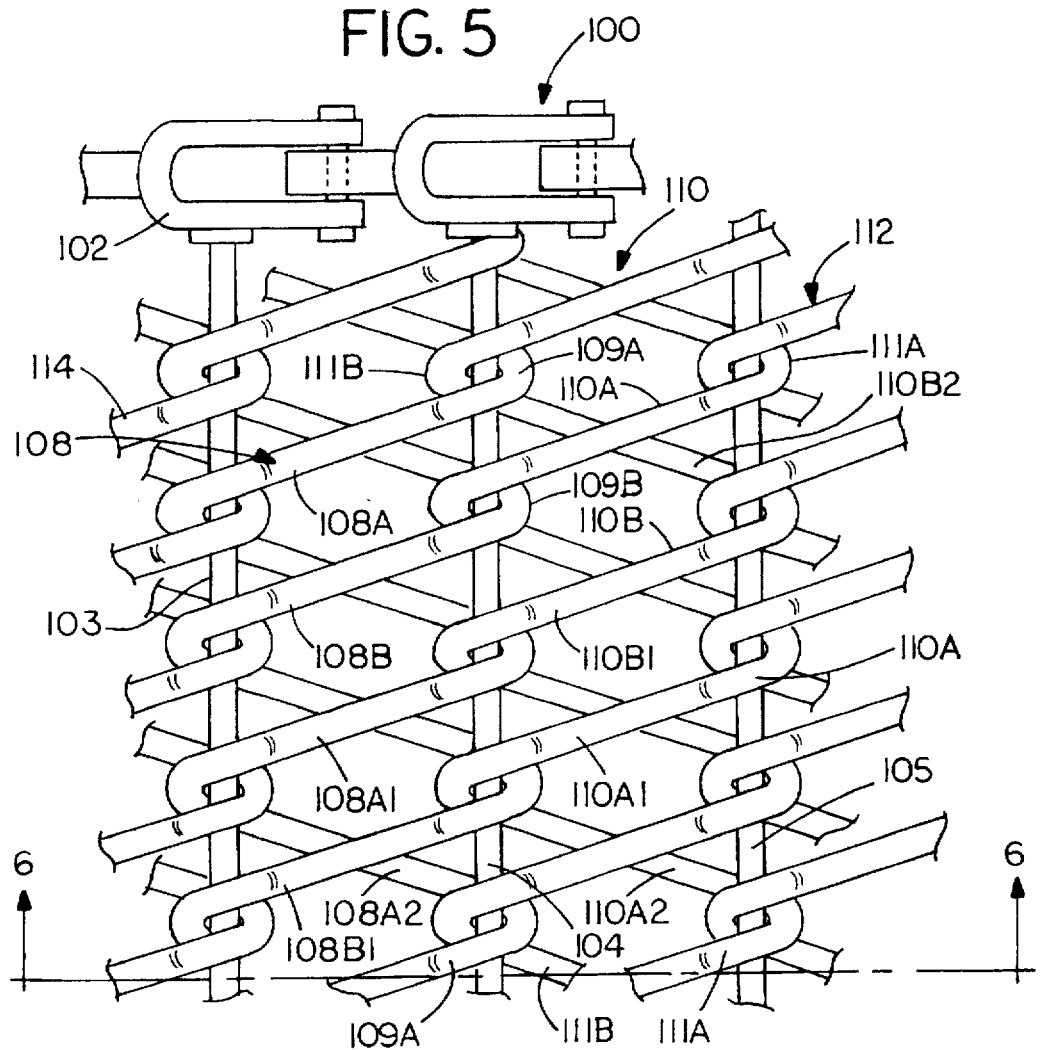
FIG. 5 is a top plan view of an open space grid formed on the food conveyor cross rods.
Figure 6:
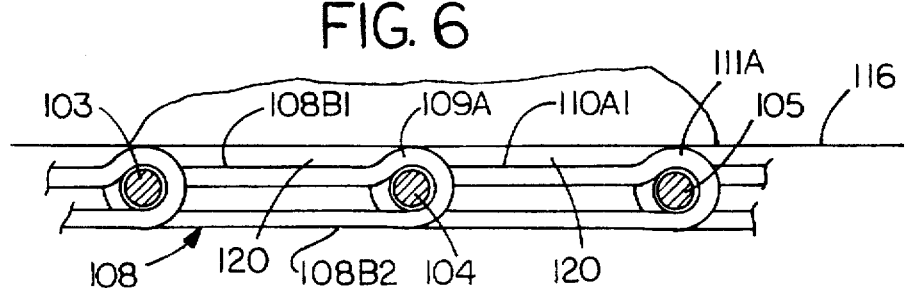
FIG. 6 is a sectional view taken on line 6—6 in FIG. 5.
Figure 7:
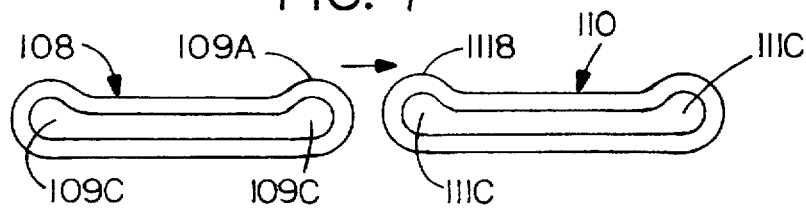
FIG. 7 is a schematic exploded view of flattened wire helical coils that are mounted to conveyor cross rods.

A modified form of the open space grid used immediately below the support plane for the food product, which in the previous form of the invention comprised the open space grid assembly 66, is shown in FIGS. 5, 6 and 7. In this form of the invention, a known conveyor having cross rods mounted onto side roller chains, has a series of helically wound support wires or rods extending between each adjacent pair of cross rods. This type of conveyor is available for supporting food products during "proofing", but by modifying the wires that extend between the rods as will be explained, the conveyor and the lengths of wire or rods between the cross rods act as an open space grid. Such conveyors are available from Ashworth Bros. Inc. in Winchester, Va. and Fall River, Mass., USA, and are known as rod reinforced conveyor belts.

A wire of suitably size and length is formed into a flattened helix, that is, it is elongated transverse to the axis. The helix has end loops (see FIG. 7) formed by flattening the helix. The helical connectors are much like coil springs that are flattened and have a longitudinal length that extends along the direction of the conveyor or cross rods. The end portions of two separate flat wire helixes are overlapped or interleafed, and a cross rod is inserted so that the rod holds the two end portions together much like a hinge rod.

As can be seen in FIG. 5, a conveyor assembly 100 is conventional design for a rod conveyor used in broilers except that it has the flattened coils of wire formed to provide a clearance between the meat product and the wire lengths in the regions between the cross rods of the conveyor. The conveyor includes a conveyor roller chain shown only schematically at 102 on each side of the conveyor. The roller chain supports a plurality of cross rods shown at 103, 104 and 105, respectively.

The cross rods 103, 104 and 105 extend all the way across the broiler in the same manner as the conveyor 14. In this form of the invention, however, the cross rods are coupled together with a series of double wound flattened wire or thin rod coils. By double wound, or bifilar wound, it is meant that there are two wires that are formed into the coil so that the straight lengths between the end loops of the coil are doubled in density.

For example, there are coil assembly 108 that extends between rods 103 and 104, and coil assembly 110 that extends between rods 104 and 105. The coil assembly 108 includes a first wire 108A formed into a helically wound coil and a second wire 108B also formed into a helically wound coil. The coils 108 and 109 have lengths of wire between end loop portions 109A for coil 108A and end loop portion 109B for coil 108B the straight lengths are shown at 108A1 and 108B1 for the two coils and it can be seen that these lengths are parallel to each other. The bifilar coils 108A and 108B can be made by standard procedures, and are modified for this usage as this will be explained.

The coil assembly 110 includes a single wire 110A formed into one coil and a separate wire 110B formed into a second coil by bifiler winding. These wires 110A and 110B are formed into helical members that have straight lengths 110A1 and 110B1 between end loop portions 111A and 111B. The lengths 110A1 and 110B1 are straight and are parallel between the conveyor cross rods 104 and 105. Additionally, there would be a helical coil assembly 112 that would extend to the next rod adjacent rod 105, and a coil assembly 114 that would extend to the next rod of the conveyor 100 adjacent rod 103.

For assembly, the end loop portions 109A and 109B are interleafed with the end loop portions 111A and 111B of the adjacent coil assembly 110, and then the rod 104 is inserted through the overlapped loops. This is illustrated in FIG. 7, which is an exploded view showing the double coil assembly 110 on one side, with the end portion 111B illustrated, and the coil assembly 108 with the end portion 109A illustrated. These two coil assemblies are moved together so that the opening illustrated at 109C or the coil assembly 108 overlaps with the opening 111C of the coil assembly 110. Then the rod 104 is slipped through the aligning openings 109C and 111C for interlocking. This assembly is also shown in FIG. 6.

As can be seen, the upper lengths 108A1 and 108B1 of the coils 108A and 108B on the upper side of the conveyor are formed to make the end portions 109 more than 180° around the respective cross rod and the upper lengths 110A1 and 110B1 of coils 110A and 110B likewise are formed more than 180° around the rod 104, so that these upper lengths are below the plane 116 along which the food is supported. The meat product 28 spans at least two of the conveyor rods, and is supported on the upper sides of the end loop portions 109A and 109B as well as the end loop portions 111A and 111B. The straight upper lengths of wire 108B1 and 108B2 and 110B1 and 110B2 not only are below the food, so they do not sear lines in the food, but they are formed to provide an air space indicated at 120 underneath the meat product. Fat striking these upper lengths of the helically coiled wires will oxygenate and vaporize. The lower lengths 108A2, 108B2, and 110A2 and 110B2 are formed to be tangent to the lower side of the joining rods 103, 104 and 105.

The coils 112 and 114 are formed in the same manner, and engage the next adjacent rods in the cross rod conveyor.

The arrangement of the flattened and formed wire coil assemblies, 108, 110, 112 and 114 fulfill the requirements of forming two open space metal grids that are spaced apart vertically, and also are formed to be spaced from the meat product. These open space metal grids formed by coil assemblies 108 and 110 also act as flame arrestors. In actual size, the individual wire length of each of the coil assemblies that extend between the cross rods, such as the upper lengths 108A1 and 108B1 are spaced apart a distance that is small enough to provide flame quenching. In this form of the invention the conveyor itself carries the open space metal grid that performs the function of flame arresting as well as dispersing the fat, causing turbulent mixing with air so that the fat will be vaporized, and oxygenated. Flare ups will be minimized.

When the form of the invention shown in FIGS. 5, 6 and 7 is utilized, there are actually four layers of open space grid between the food support plane 116 and the open space grid 56 or grid portion 56A. The additional layers further enhance operation to reduce flare ups, provide flame quenching, and aid in vaporizing the fat that drips from the meat products by causing turbulence of air flow through the broiler.

The amount of space between the meat support plane 116 and the upper lengths of wires of the coil assemblies 108 and 110 that are positioned between the adjacent cross rods is sufficient to clear the meat product even with normal undulations that would be present in a hamburger patty for example.

The meat directly contacts only the regions at the cross rods of the conveyor as it does in the first form of the invention. Helical, flattened coils still act as a spring, so that the coils can be stretched out or compressed together along the longitudinal axis of the coils, which is parallel to the cross rods to achieve the desired spacing of the wires forcing the lengths between the cross rods. Wire diameter in the range of $1/16$ of an inch is used preferably.

The open space grids positioned below the upper burners prevent flashback fires onto the product or adjacent the product that may reduce the product appearance, taste and other organoleptic qualities.

The overall system thus improves the quality and appearance of the food product being carried on the conveyor and broiled, by preventing flare-ups through the use of screens acting as flame arrestors on the drip pan, and between the upper burners and the food product. The spacing between the adjacent burner housings is also to provide flame arresting effects.

The greatest benefits are realized by open space grids positioned below the food support plane on the upper length of the conveyor, which cause the oils and fats to be formed into a thin film that will vaporize, so as to reduce pyrolization. The vapors formed can burn off quickly and cleanly, not only because of the lower temperatures provided by the cooling effect of the oil when oil hits the low thermal mass open space grids, but also because the open space grids cause turbulence of the air, and as the turbulent air exits the open spaces there is enhanced fat vaporization and quick combustion of the vapor with small flames. The double layer of open space grids formed as assembly 66 enhances that function.

The addition of the air from the plenum 75, if used, into the space between the two spaced grids 68 and 70 further aids in oxygenation of the oils for vaporizing and clean burning. The added air from the plenum is of greatest benefit for food having fat products in the range of greater than 25%.

The open space grid above the lower burners and below the conveyor also contributes significantly to the overall reduction of flare-ups and unwanted fat combustion byproducts, by causing the fat to form a thin film, vaporize and burn cleanly, as well as arresting any flare-ups of flames that may occur from the lower burners.

In each instance, the open space grids or screens act to cause the liquid grease or oil to wet the narrow metal surfaces between the openings or perforations, exposing more oil surface and promoting vaporization and clean combustion. The low mass of the thin grid or screen quickly cools as the oil vaporizes and reduces the likelihood of pyrolysis of the oil until the oil is ignited and burning in the presence of air. The perforated sheets remain at a temperature to permit substantially complete fatty oil combustion but remain cool enough to slow pyrolysis. Improved air distribution and blending results from currents of air passing through the apertures or openings in each of the open space grids and particularly through the grids directly under the food being broiled.

The open spaces also have to provide for transmission of radiant heat from the heat sources for flame broiling satisfactorily. The majority of the broiling is from the heat sources or burners with little or no cooking by burning fat. With the present invention, using airflow from existing exhaust systems in the broiler and providing inlets to cause air to flow upwardly through the open space metal grids, the flames below the meat patty are clean and short lived so they do not contact the meat. Flames at or above the patty do not affect the broiling substantially.

The flame quenching effect is caused by initiation of flames on or above an open space grid. The flames will not substantially pass through a higher grid. Enough heat passes upward by convection and radiation to heat the screens at all layers to a temperature adequate for fat ignition. Multiple distinct layers of flames are visible in a broiler using the present invention of vertically stacked perforated sheets.

It is to be understood that the term open space grid is intended to include perforated sheets, the wire network of FIG. 5, woven screen, welded wire screen and other screens or grids having the desired range of open area.

Although the present invention has been described with reference to preferred embodiments, workers skilled in the art will recognize that changes may be made in form and detail without departing from the spirit and scope of the invention.

What is claimed is:

1. A broiler apparatus comprising a frame;
a conveyor mounted on the frame having an upper food conveying length;
at least one broiler heat source mounted on the frame adjacent to and extending laterally across the food conveying length and positioned below the food conveying length of the conveyor, and an open space metal grid positioned below a food support plane of the food conveying length and in registry therewith, said open space metal grid causing vaporization of fat from a food product supported on the conveyor and causing mixing of the vapors with air above the open space metal grid as the heat source is used for broiling a food product.

2. The broiler of claim 1, wherein the open space grid has between about 25% and 75% open space to provide a low thermal mass.

3. The broiler of claim 1, including a second open space grid spaced from and in registry with the first mentioned open space grid and secured relative to the first mentioned open space grid to form an assembly, the assembly being positioned between the food conveying length and a return length of the conveyor.

4. The broiler of claim 3, wherein the first and second open space grids comprise separate sheets of metal having perforations to form the open space, the first and second sheets being spaced apart in the range of ⅛ to ½ inch, the sheets extending substantially along the entire length of the food conveying length of the conveyor.

5. The broiler of claim 3, wherein the open space grids have an open area of in the range of about 60% to 65%.

6. The broiler of claim 1, wherein open space of the open space grid lowers the thermal mass of the open space grid so that fat dripping on the open space grid will form a thin oily film on the grid between open spaces for vaporization.

7. The broiler of claim 1, and a second heat source mounted on the frame and positioned above the food conveying length of the conveyor, and a second open space grid portion between the second heat source and the food product, said second open space grid portion being spaced from the second heat source and from the food product and acting to arrest flames that strike the second open space grid portion.

8. The broiler of claim 7, and a third open space grid portion positioned below a return length of the conveyor, and below the first mentioned open space grid and above the first mentioned heat source, said third open space grid portion having an open area to form a low thermal mass effective at broiler operating temperatures to cause fat dripping on the third open space grid portion to form a thin oil film on an upper surface of the third open space grid portion.

9. The broiler of claim 8, wherein the broiler has a drip pan positioned below the first mentioned heat source for catching liquid fat, and a fourth open space grid overlying at least a portion of the drip pan to form a flame arrestor sheet.

10. The broiler of claim 4 and an air plenum for directing air between the first and second open space grids forming the assembly.

11. The broiler of claim 10, wherein the open space grid have an open area of about 60% to 65% of the total area of the grids, respectively.

12. The broiler of claim 1, wherein said conveyor comprises a plurality of parallel cross rods, said open space grid comprising a plurality of wire like members having lengths extending between adjacent cross rods and supported thereon and being positioned below the food support plane in a region between the adjacent cross rods.

13. The broiler of claim 12, wherein the wire like members comprise helically wound wire like member coils having end loops joining the lengths between adjacent cross rods, the cross rods passing through the end loops to support the coils.

14. The broiler of claim 13, wherein each cross rod receives the end loops of coils extending in opposite directions to adjacent cross rods positioned spaced in both directions from the respective cross rod.

15. In a broiler assembly for broiling food products including a frame, a food product conveyor having a food product conveying length and a return length, the conveyor being mounted over conveyor supports at opposite ends of the broiler, a first set of lower broiler heat sources below the return length of the conveyor, and a second set of upper broiler heat sources above the food conveying length of the conveyor, said heat sources being operable to broil fat containing food products carried on the product conveying length when the conveyor is operated and the food product moves from an inlet end to an outlet end, the improvement comprising:

first open space metal grid portions overlying all of the lower heat sources and positioned between the conveyor return length and such burners;

a second open space metal grid positioned below a food support plane of the food conveying length, said second open space metal grid overlying the first open space metal grid and the lower heat sources and being in registry with the upper heat sources, said second open space metal grid being positioned to receive fat drippings from a food product on the food conveying length of the conveyor; and a third open space metal grid underlying the upper heat sources and positioned between the upper heat sources and the food product on the food product conveying length of the conveyor, said open space metal grids all having between about 25% to 75% open area to provide low thermal mass grids, whereby the open space metal grids heated by the heat source during broiling and receiving fat drippings transfer heat to the fat drippings to cause the fat drippings to form a film across the open space metal grids to aid in vaporizing the fat.

16. The broiler of claim 15 and an air plenum for directing air along the second open space metal grid to cause turbulent movement of air relative to open space in the second open space metal grid to aid in vaporization of fat collecting on the second open space metal grid.

17. The broiler of claim 16 and a fourth open space metal grid coextensive with the second open space metal grid and spaced therefrom to form an assembly between the food support plane and the return length of the conveyor, the plenum directing air into a space between the second and fourth open space metal grids.

18. A broiler apparatus comprising a frame;

a food product support on the frame;

at least one heat source mounted on the frame adjacent to and below the food product support;

a perforated sheet assembly positioned below the food product support and in registry therewith, said perforated sheet assembly comprising a pair of perforated sheets that are spaced apart and generally coextensive, said perforated sheets receiving fat dripping from a food product being broiled by the heat source, and perforations in the perforated sheets causing turbulent air flow through the perforations in the perforated sheets to aid in vaporization of liquid fat.

19. The broiler of claim 18, wherein the perforated sheets are perforated to have between about 25% and 60% open area to provide low thermal mass.

20. The broiler of claim 18, wherein the perforated sheets are spaced apart in the range of ⅛ to ½ inch.

21. The broiler of claim 20, wherein the perforated sheets have in the range of about 60% to 65% open space and the food product support comprises a food product conveying length of an endless conveyor, the conveyor having a return length, the perforated sheet assembly being mounted between the food product conveyor length and the return length.

* * * * *